United States Patent
Cheng

(10) Patent No.: US 7,484,818 B2
(45) Date of Patent: Feb. 3, 2009

(54) COMPUTER CHASSIS FRAME SUPPORT

(75) Inventor: Stan Cheng, Taipei (TW)

(73) Assignee: Shuttle Inc., Taipei (TW)

( * ) Notice: Subject to any disclaimer, the term of this patent is extended or adjusted under 35 U.S.C. 154(b) by 0 days.

(21) Appl. No.: 10/803,474

(22) Filed: Mar. 17, 2004

(65) Prior Publication Data
US 2004/0246671 A1    Dec. 9, 2004

(30) Foreign Application Priority Data
Mar. 17, 2003    (TW)    .............................. 92204073 U

(51) Int. Cl.
A47B 97/00    (2006.01)
(52) U.S. Cl. .................................... 312/223.2; 361/683
(58) Field of Classification Search .............. 312/223.1, 312/223.2, 265.6, 265.5, 265.4, 265.3, 265.2, 312/265.1, 256.6, 257.1; 361/683, 685, 724, 361/725, 726, 727, 681
See application file for complete search history.

(56) References Cited

U.S. PATENT DOCUMENTS

| | | | | |
|---|---|---|---|---|
| 1,915,369 A | * | 6/1933 | Lane et al. | ................... 206/509 |
| 3,892,273 A | | 7/1975 | Nelson | |
| 4,394,344 A | | 7/1983 | Werner et al. | |
| 5,031,070 A | * | 7/1991 | Hsu | ........................... 361/683 |
| 5,164,886 A | * | 11/1992 | Chang | ........................ 361/683 |
| 5,175,669 A | * | 12/1992 | Navia et al. | .................. 361/683 |
| 5,339,214 A | | 8/1994 | Nelson | |
| 5,495,392 A | | 2/1996 | Shen | |
| 5,504,652 A | | 4/1996 | Foster et al. | |
| 5,593,219 A | * | 1/1997 | Ho | .............................. 312/263 |
| 5,671,118 A | | 9/1997 | Blomquist | |
| 5,730,515 A | * | 3/1998 | Ho | .............................. 312/350 |
| 5,748,442 A | * | 5/1998 | Toor | ........................... 361/685 |
| 5,790,372 A | * | 8/1998 | Dewey et al. | ................ 361/683 |
| 5,839,804 A | * | 11/1998 | Ho | ........................... 312/223.2 |
| 5,959,837 A | | 9/1999 | Yu | |
| 5,995,364 A | * | 11/1999 | McAnally et al. | ........... 361/685 |
| 5,997,115 A | * | 12/1999 | Radloff et al. | ............... 312/222 |
| 6,018,457 A | * | 1/2000 | Mroz | ........................... 361/685 |
| 6,053,586 A | * | 4/2000 | Cook et al. | ............... 312/223.2 |
| 6,123,400 A | * | 9/2000 | Nicolai et al. | ............. 312/265.1 |
| 6,137,678 A | * | 10/2000 | Gebara et al. | ................ 361/685 |
| 6,157,532 A | * | 12/2000 | Cook et al. | .................. 361/681 |
| 6,212,074 B1 | | 4/2001 | Gonsalves et al. | |
| 6,223,815 B1 | | 5/2001 | Shibasaki | |
| 6,288,895 B1 | | 9/2001 | Bhatia | |

(Continued)

FOREIGN PATENT DOCUMENTS

EP    1545178 A1 *    6/2005

(Continued)

Primary Examiner—James O Hansen
(74) Attorney, Agent, or Firm—Muncy, Geissler, Olds, & Lowe, PLLC

(57) ABSTRACT

A computer chassis frame includes a support structure on a load-bearing surface of the frame to support a computer chassis cover installed over the frame. The support structure may comprise a plurality of rounded portions on the load-bearing surface of the computer chassis frame, which provide multiple load points to distribute the cover's load on the frame. In addition, a computer chassis may include a removable structure for computer devices, where the removable structure includes an interface configured to mate with the support structures of the computer chassis frame.

5 Claims, 2 Drawing Sheets

U.S. PATENT DOCUMENTS

| | | | |
|---|---|---|---|
| 6,310,769 B1 * | 10/2001 | Johnson et al. | 361/683 |
| 6,328,097 B1 | 12/2001 | Bookhardt et al. | |
| 6,352,103 B1 | 3/2002 | Chu et al. | |
| 6,394,175 B1 | 5/2002 | Chen et al. | |
| 6,404,624 B1 * | 6/2002 | Jeong | 361/683 |
| 6,404,634 B1 | 6/2002 | Mann | |
| 6,407,916 B1 | 6/2002 | Konstad | |
| 6,418,018 B1 | 7/2002 | Lo | |
| 6,437,977 B1 * | 8/2002 | Yu | 361/685 |
| 6,480,387 B1 | 11/2002 | Lee et al. | |
| 6,519,149 B1 | 2/2003 | Inoue | |
| 6,529,373 B1 * | 3/2003 | Liao et al. | 361/685 |
| 6,574,101 B2 | 6/2003 | Tanaka et al. | |
| 6,621,698 B2 | 9/2003 | Chang | |
| 6,643,133 B1 | 11/2003 | Liu | |
| 6,646,880 B1 | 11/2003 | Liu | |
| 6,650,540 B2 | 11/2003 | Ishikawa | |
| 6,654,238 B2 * | 11/2003 | Chen | 361/685 |
| 6,654,243 B2 | 11/2003 | Sheu | |
| 6,667,880 B2 * | 12/2003 | Liu et al. | 361/685 |
| 6,700,777 B2 * | 3/2004 | Chen | 361/685 |
| 6,704,976 B1 | 3/2004 | Chen | |
| 6,708,754 B2 | 3/2004 | Wei | |
| 6,754,071 B2 * | 6/2004 | Lin et al. | 361/685 |
| 6,798,653 B2 * | 9/2004 | Chen et al. | 361/685 |
| 6,826,039 B2 * | 11/2004 | Chen | 361/679 |
| 6,882,527 B2 * | 4/2005 | Wang et al. | 361/685 |
| 6,906,927 B2 * | 6/2005 | Su | 361/727 |
| 2002/0084062 A1 | 7/2002 | Chen | |
| 2002/0089818 A1 * | 7/2002 | Chen | 361/683 |
| 2003/0005584 A1 | 1/2003 | Komatsu et al. | |
| 2003/0183373 A1 | 10/2003 | Sarraf et al. | |
| 2004/0008482 A1 * | 1/2004 | Gan et al. | 361/685 |
| 2004/0052055 A1 | 3/2004 | Liu | |
| 2005/0078442 A1 * | 4/2005 | Chen | 361/683 |
| 2005/0105267 A1 * | 5/2005 | Cheng | 361/690 |

FOREIGN PATENT DOCUMENTS

| | | | |
|---|---|---|---|
| EP | 1545179 A1 * | 6/2005 | |
| GB | 2399686 A * | 9/2004 | |
| JP | 2000174188 A | 6/2000 | |
| JP | 200250660 A | 9/2000 | |

* cited by examiner

COMPUTER CHASSIS FRAME SUPPORT

CROSS REFERENCE TO RELATED APPLICATIONS

This application claims the right of priority based on Taiwanese application serial no. 092204073, filed Mar. 17, 2003, which is herein incorporated in its entirety by reference.

BACKGROUND

1. Field of the Invention

This invention relates generally to computer chassis, and specifically to structural supports on computer chassis frames.

2. Background of the Invention

Computer chassis covers prevent electromagnetic emissions generated by the electronic components within a computer from leaking into the external environment. In the assembly of a computer, mounting the chassis cover onto a chassis frame is typically the last step of putting together the computer, after the motherboard, drives, and other components have been secured to the chassis frame. Chassis frames thus must serve at least two purposes: they must allow for access to the confines of the computer chassis during installation, and they must also provide a support structure for the chassis cover. Thus, frames are often lightweight and open on several faces. At the same time, they must also withstand the weight of the chassis cover and other foreseeable loads. Multiple small open semi-circular tabs often border frame rails, providing a discontinuous surface for contact with the chassis frame cover. While this helps makes the frame more lightweight, the presence of point contacts between the chassis cover and chassis frame can cause the chassis cover to deform, particularly when heavy objects are placed on it.

Thus there is a need for a chassis frame structure with an improved interface between the chassis frame and the chassis cover.

SUMMARY OF THE INVENTION

The present invention overcomes the shortcomings of the prior art by providing an improved computer chassis frame. In one embodiment of the invention, the computer chassis frame includes a rounded portion on an upward facing plane of the frame. The rounded portion can support a chassis cover installed on the frame. Supported by the rounded portion, the chassis cover can avoid being subject to the point stresses that characterize the prior art, reducing the risk of the cover straining or deforming.

In another embodiment, a computer chassis frame features a plurality of rounded portions on top of which a computer chassis cover can be mounted. By providing multiple load points for the computer chassis cover, the computer chassis frame can better distribute mechanical stress along the frame structure.

In another embodiment, a removable structure, such as a drive installation tray, is adapted to be installed in a computer chassis. In an embodiment, the removable structure includes a hollow tab configured to fit around the perimeter of the rounded portion of a computer chassis frame. When the removable structure is installed on the chassis frame, it is laterally secured by the rounded portion on the chassis frame.

DETAILED DESCRIPTION OF THE PREFERRED EMBODIMENTS

Figure 1:
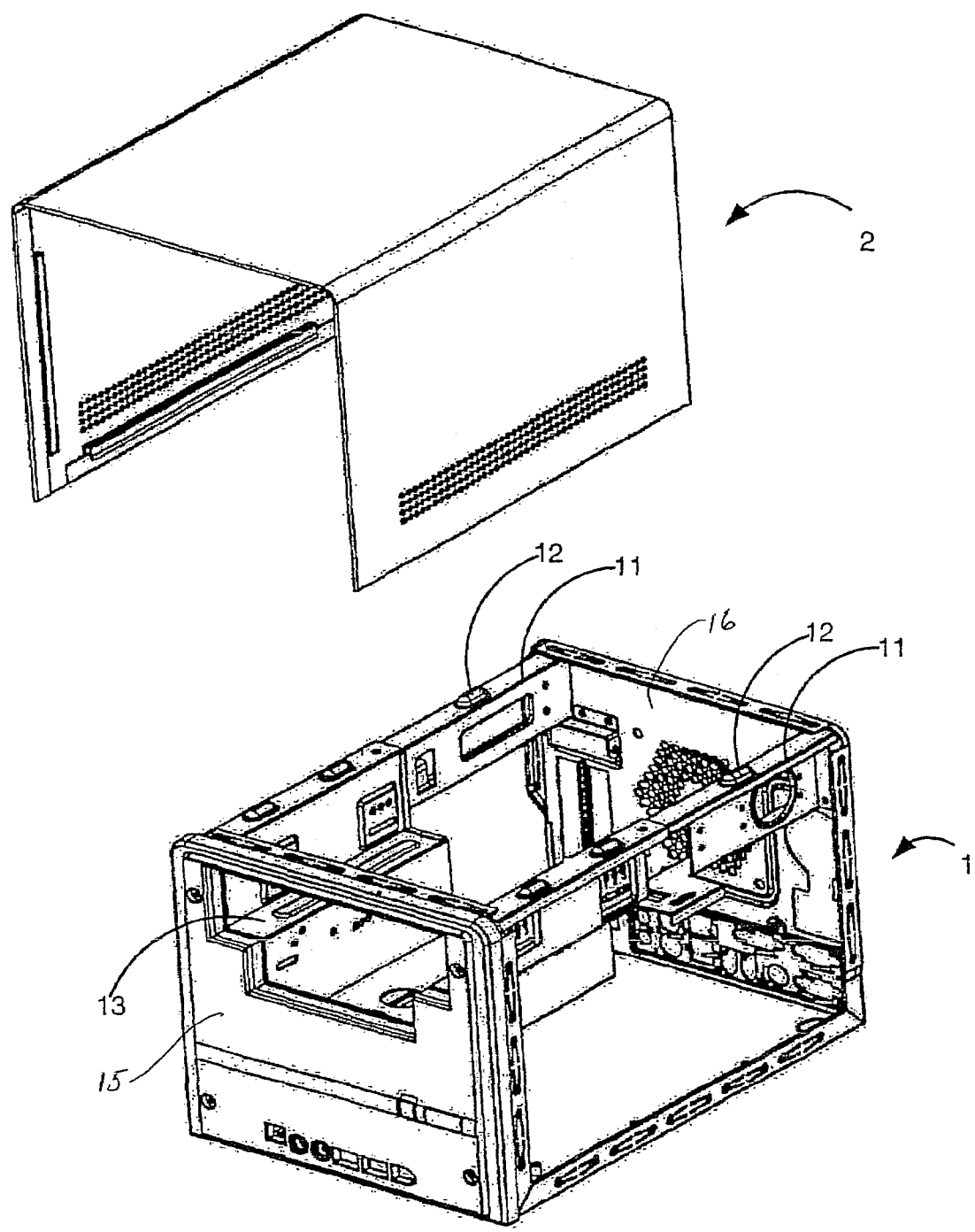
FIG. 1 is an exploded view of a computer chassis frame support and computer chassis cover in accordance with an embodiment of the present invention.

FIG. 1 is a view of a computer chassis frame 1 and computer chassis cover 2 in accordance with an embodiment of the present invention. FIG. 1 illustrates the computer chassis frame 1 with a removable drive frame 13 and a computer chassis cover 2 sized to fit over the frame 1. Although the chassis frame 1 and cover 2 of FIG. 1 are sized for use with a small form factor computer, other sizes and shapes of chassis frames and covers, for use with other types of computers, may also be used.

The chassis frame 1 allows for access to the interior of the computer chassis from multiple sides for ease of component installation. The frame 1 includes two load-bearing surfaces on rails 11 that border the top of the frame 1. The rails join a front frame 15 to a rear frame 16. Each of the rails has several rounded portions 12. The frame 1 shown in FIG. 1 includes three pairs of oblong rounded domes 12 distributed evenly along each of the rails 11. Alternatively, fewer or more domes 12 may be used in particular implementations of the invention.

In another embodiment of the invention, a convex surface with a flat top may be formed integrally to or mounted to a chassis frame 1 to support a chassis cover 2. Structures with other shapes such as a hemisphere, rounded prism, or vault, for instance, mounted to or formed integrally to other parts of the upper surface of a chassis frame 2, may also be used to provide support surface to a chassis cover 2. A structural advantage of having multiple support surfaces on the frame 1 is that the stress experienced by the chassis cover 2, for instance as a result of heavy objects being placed on top of it or transportation of the chassis, can be distributed over multiple contact points. This reduces the risk of the cover deforming. In addition, the open layer between the chassis frame 1 and the chassis cover 2 in between support surfaces provides an area in which the chassis cover 2 can flex.

Figure 2:
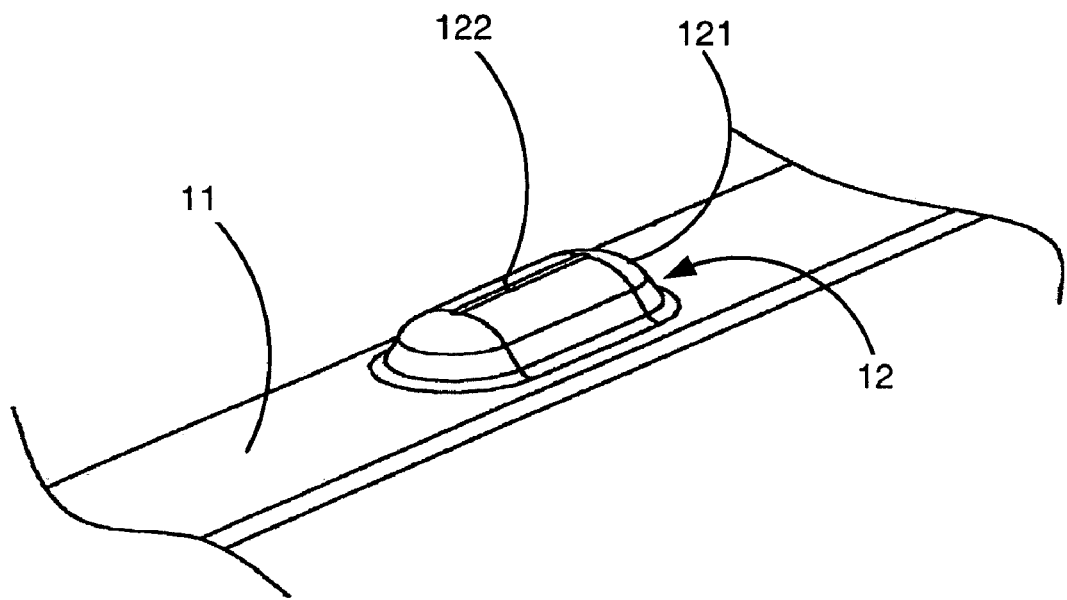
FIG. 2 is a top view of a portion of the computer chassis frame support of FIG. 1 in accordance with an embodiment of the present invention.

Over the domes 12 may be mounted a chassis cover 2. FIG. 2 is a top view of a portion of the computer chassis rail 11 of FIG. 1 that shows the rounded dome 12 of FIG. 1 in greater detail. The rounded dome 12 of FIG. 2 is formed integrally with the rail by deforming that portion of the rail into the dome shape. In other embodiments, however, a rounded dome 12 or other support structure can be attached or mounted to the chassis frame 1, for instance by welding the dome to the frame.

As shown in FIG. 2, the top of the dome 12 may feature a flat surface 122 for supporting the chassis cover 2. When installed on top of the computer chassis frame 1, a computer chassis cover 2 makes contact with and rests on the flat surface 122 of the rounded dome 12. This prevents load stress from concentrating at a single point or line segment on the structure, which could cause the cover 2 to deform. In addition, the shape of the dome, lacking sharp edges, reduces the risk that the frame 1 will damage the cover 2.

As shown in FIG. 1, the two pairs of domes 12 towards the front and middle portions of the computer chassis frame 1 may also support a removable drive frame 13. In other embodiments, the chassis frame 1 may support other devices or housing structure to be installed within a chassis. The drive frame 13 as shown is removable and can be used to install a 5¼-inch drive on top of a 3½-inch drive. After the drive frame 13 is removed from the chassis frame 1, the computer drives can be installed in it, and then the entire assembly can be installed into the chassis frame 1. This avoids the need to install the computer drives from within the confines of the chassis.

As shown, the drive frame 13 comprises two flanges that fit over the rails 11 of the chassis frame 1. In particular, the flanges each have protruding surfaces that correspond to the rounded domes 12 on the rails 11 of the chassis frame 1. The drive frame 13 is mounted to the chassis frame 1 by aligning the protruding surfaces of the flange with the rounded domes 12 of the rails 11 of the chassis frame 1. This way, the drive frame 13 can be secured laterally, along the direction of the rails 11, by the vertical surfaces 121 of the rounded domes 12. Even if the drive frame 13 is attached to the chassis frame 1 through screws or other attachment mechanisms, the vertical surfaces 121 of the rounded domes 12 additionally secure the removable drive frame 13 to the chassis frame 1 and reduce the strain imposed on the attachment mechanism. In other embodiments, other chassis frame interfaces for connecting a removable drive frame 13 or other structure to a chassis frame 1 are also possible. For instance, the drive frame 13 could be fitted with a hollow tab configured to fit around the perimeter of a rounded dome 12 or other raised surface, thereby also securing the drive frame 13 to the chassis frame 1.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

I claim:

1. A computer chassis apparatus comprising:
   a chassis frame comprising a plurality of load-bearing rails extending from a front frame to a rear frame and located on edges of the frame;
   a chassis cover for fitting over the chassis frame;
   a plurality of dome-shaped protrusions formed on tops of the load-bearing rails and distributed evenly therealong and supporting the chassis cover; and
   a removable drive frame to house at least one computer component for installation within the computer chassis apparatus, the drive frame having dome-shaped interface structures corresponding in size and shape to each dome-shaped protrusion, to laterally secure the removable drive frame to the chassis frame in at least two directions by coupling the protrusions with the interface structures, which are secured thereover.

2. The apparatus of claim 1, wherein the chassis frame is for a small form factor computer.

3. The apparatus of claim 1, wherein each protrusion has a flat top surface to support the chassis cover.

4. The apparatus of claim 1, wherein each protrusion is formed integrally into one of the load-bearing rails of the chassis frame.

5. The apparatus of claim 1, wherein each protrusion is mounted to one of the load-bearing rails of the chassis frame.

* * * * *